United States Patent [19]

Nishikawa et al.

[11] 4,388,427
[45] Jun. 14, 1983

[54] HEAT-SET TYPE PRINTING INKS

[75] Inventors: Syuzi Nishikawa; Toru Matsubara; Kazuyoshi Iida; Seiichiro Tahara, all of Kyobashi, Japan

[73] Assignee: Toyo Ink Manufacturing Co., Ltd., Tokyo, Japan

[21] Appl. No.: 301,152

[22] Filed: Sep. 11, 1981

[30] Foreign Application Priority Data

Sep. 28, 1980 [JP] Japan .................................. 55-130710

[51] Int. Cl.³ ...................... C09D 11/06; C09D 11/08
[52] U.S. Cl. ...................................... 523/500; 106/20; 106/28; 106/29; 106/30; 523/160; 523/161; 523/400; 523/463; 524/272; 524/499; 524/764; 524/798; 527/600
[58] Field of Search ............... 523/500, 160, 161, 400, 523/463; 524/499, 798, 272, 764; 527/600; 106/20, 27–30, 32; 525/7, 7.1

[56] References Cited

U.S. PATENT DOCUMENTS

| 2,586,092 | 2/1952 | Robinson | 525/7 |
| 2,598,645 | 5/1952 | Marling | 525/7 |
| 2,606,161 | 8/1952 | Marling | 525/445 |
| 2,713,039 | 7/1955 | Cadwell et al. | 525/7.1 |
| 4,248,746 | 2/1981 | Greiner | 106/30 |
| 4,268,427 | 5/1981 | Miyaguchi et al. | 106/20 |

FOREIGN PATENT DOCUMENTS

| 54-152503 | 5/1978 | Japan | 106/30 |
| 2051088 | 1/1981 | United Kingdom | 106/30 |

Primary Examiner—Ronald W. Griffin
Attorney, Agent, or Firm—Jordan and Hamburg

[57] ABSTRACT

A heat-set type printing ink comprising as the vehicle a non-aqueous dispersion prepared by dissolving a resin in a hydrocarbon solvent-containing solvent boiling at not lower than 170° C. to form a resin solution and polymerizing at least one kind of vinyl monomer in said resin solution to obtain a non-aqueous dispersion. In one embodiment, the thus obtained non-aqueous dispersion may be incorporated with a resin to obtain a modified non-aqueous dispersion.

5 Claims, No Drawings

HEAT-SET TYPE PRINTING INKS

This invention relates to a novel heat-set type printing ink.

Conventional heat-set type printing inks contain a vehicle prepared by dissolving an alkyd resin, petroleum resin, phenolic resin or modified resin thereof in a drying oil such as linseed oil or dehydrated castor oil or in a petroleum-derived solvent boiling at a high temperature. It was impossible to dry printing inks containing such a vehicle when they were printed on paper and attempted to be dried unless the paper so printed had been heated to 100° C. or higher. However, heating of such an ink-printer paper to 100° C. or higher is disadvantageous in that it incurs paper quality degradation due to the formation of blisters and cracks caused by folding the paper since the moisture contained in the paper is lost by evaporation and that it further incurs the evolution of a considerable amount of gases from the paper and ink printed thereon, the gases being troublesome to dispose of. Such heating causes the moisture contained in the paper to evaporate in an unnecessarily large amount, this being also disadvantageous from the view-point of economy of energy.

Thus, there have been sought printing inks which can be dried at a lower temperature from the view-point of energy economy and the like.

The primary object of this invention is to provide heat-set type printing inks which eliminate the aforesaid drawbacks, may be heat set at low temperatures as compared with conventional ones and will provide prints having excellent gloss when printed and dried or cured.

In one aspect of this invention, the heat-set type printing inks comprise as the vehicle a non-aqueous dispersion prepared by dissolving a resin in a hydrocarbon solvent-containing solvent having a boiling point of at least 170° C. to obtain a solution and polymerizing at least one kind of vinyl monomer in the thus obtained solution. In the other aspect of this invention, the printing inks comprise as the vehicle a composition prepared by incorporating the dispersion with a resin.

The hydrocarbon solvent-containing solvent may be used in an amount by weight of preferably 100–200 parts per 100 parts by weight of the total of the resins.

The printing inks have an excellent property that they may be heat set or cured even at temperatures lower than 100° C., in addition, they are satisfactory in gloss of prints to be obtained therefrom, printability and preservability. The reason why they may be heat set at such lower temperatures after printed on paper is considered that the resin component and the polymer component are dissolved in each other as the solvent is gradually removed from the ink film by evaporation with heat and/or infiltration into the paper, thereby to form a heat-set ink film.

The hydrocarbon solvents which may be used in this invention include paraffinic hydrocarbons boiling at at least 170° C. such as decane, undecane, dodecane, tridecane, pentadecane and hexadecane; alicyclic hydrocarbons such as tetramethylcyclohexane, 1-isopropyl-1-methylcyclohexane, n-hexylcyclohexane and n-propylcycloheptane; and aromatic hydrocarbons such as sec.-butylbenzene, amylbenzene and hexylbenzene. They may be used alone or in combination. Furthermore, in cases where a printing ink according to this invention is to be used in offset printing, it is desirable from the view-point of prevention of the effect of a solvent on the blanket and plate of a printing press to use a solvent containing paraffinic hydrocarbons in an amount by weight of at least 50%, preferably 60–95%, of the total of the solvent. The other materials boiling at not lower than 170° C. which may be incorporated in the hydrocarbon solvent according to this invention, include alcohols such as 2-ethylhexyl alcohol, octyl alcohol and n-decanol; polyhydric alcohols such as ethylene glycol, propylene glycol and glycerine; ketones such as isophorone and acetonylacetone; ethers such as diethylene glycol dibutyl ether and tripropylene glycol methyl ether; and esters such as 2-ethylhexyl acetate, nonyl acetate and acetic acid diethylene glycol monoethyl ether. These other materials may be used in such an amount that they do not impair the stability of the resulting non-aqueous dispersion and have no adverse effects on printing operations; they may be used in an amount by weight of up to about 40% of the total of the solvent.

It is undesirable to use a large amount of a solvent having a lower boiling point in the preparation of a non-aqueous dispersion since this will raise a problem as to the stability of the dispersion at the time of printing, however, it would be possible to use such a solvent if used in a small amount.

The resins which may be used in this invention are not specifically limited so far as they are soluble in the aforesaid solvents and the resulting vehicle is stable. However, it is preferable to use at least one member selected from petroleum resins, modified rosin resins and alkyd resins, these resins having heretofore been used as a vehicle for conventional heat-set type printing inks, in the preparation of novel heat-set type printing inks of this invention in order to allow these novel inks to have various properties, such as printability, required in the inks contemplated by this invention.

The petroleum resins used herein include aliphatic petroleum resins prepared by polymerizing $C_4$–$C_5$ fractions containing isobutylene, butadiene, isoprene, piperylene and the like as the main components; aromatic petroleum resins prepared by polymerizing $C_9$–$C_{10}$ fractions containing vinyltoluene, indene, methylindene and the like as the main components; copolymerization type petroleum resins prepared by copolymerizing a mixture of said two types of main components; and alicyclic petroleum resins prepared by polymerizing an alicyclic fraction containing cyclopentadiene, dicyclopentadiene and the like as the main components.

The modified rosin resins used herein include rosin modified alkyd resins, rosin modified phenol resins, rosin modified maleic resins, rosin modified fumaric resins and rosin modified epoxy resins. More particularly, the rosin modified alkyd resins may be obtained by esterifying a polyol such as glycerine, trimethylolpropane or pentaerythritol with a polycarboxylic acid such as phthalic acid or adipic acid as well as with rosin. The rosin modified phenol resins may be prepared by reacting (1) a resol-type phenol resin obtained by addition reaction of phenol, an alkylphenol, cumylphenol, bisphenol or the like with formaldehyde, with (2) rosin or a rosin modified alkyd resin. The rosin modified maleic or fumaric resins may be prepared by addition reacting rosin with maleic or fumaric acid, and they may be further modified with a polyesterpolyol or a resol-type phenol resin. Rosin modified epoxy resins may be obtained by esterifying rosin and an epoxy resin.

The alkyd resins used herein include fatty acid-modified alkyd resins obtained by the esterification or interesterification of a fatty oil (such as linseed oil or soybean oil) or the fatty acid thereof, a polycarboxylic acid and a polyol and also include vinyl-modified alkyd resins by modifying the fatty acid-modified alkyd resin with a vinyl monomer such as a styrene or acrylic monomer.

The vinyl monomers used herein are not necessarily limited only if the resulting vinyl polymer is such that it is insoluble in a resin solution according to this invention. However, it is preferable to use a styrene type monomer such as styrene, vinyltoluene or α-methylstyrene, in an amount by weight of 30–90% of the total of the monomers used, whereby a varnish having satisfactory stability may be obtained and, in turn, an ink having a preferable ink performance tends to be easily obtained.

Vinyl monomers other than styrene-type monomers include acrylic acid esters such as methyl acrylate, ethyl acrylate, butyl acrylate and 2-ethylhexyl acrylate, and methacrylic acid esters such as methyl methacrylate, ethyl methacrylate, butyl methacrylate, 2-ethylhexyl methacrylate and lauryl methacrylate. These acrylic or methacrylic acid esters may be used in an amount by weight of 0–78%, preferably 10–70%, of the total of monomers used.

Further other vinyl monomers which may be used in an amount by weight of up to 30%, include carboxyl group-containing monomers such as acrylic, methacrylic, itaconic and maleic acids; hydroxyl group-containing monomers such as 2-hyroxyethyl acrylate, 2-hydroxyethyl methacrylate, 2-hydroxypropyl acrylate and 2-hydroxypropyl methacrylate; and functional group-containing vinyl monomers such as glycidyl acrylate, glycidyl methacrylate, N-methylolacrylamide, N-n-butoxymethylacrylamide, N-isobutoxymethylacrylamide, dimethylaminomethacrylate and N-vinylpyrrolidone.

These vinyl monomers may be used in an amount by weight of 20–200 parts, preferably 40–150 parts, per 100 parts by weight of the resin in the preparation of a varnish for use as the vehicle in a heat-set type printing ink of this invention. The use of less then 20 parts by weight of these vinyl monomers will make it difficult to disperse the resulting vinyl polymer in the resin solution and, therefore, inks containing such an unsatisfactory dispersion as the vehicle will have inferior dryability. On the other hand, the use of more than 200 parts by weight thereof will produce too many dispersed particles of the resulting vinyl polymer in the resin solution and, therefore, inks containing such a dispersion will have inferior fluidity, degraded ink transferability to paper and unsatisfactory gloss when printed and dried on a substrate, this being disadvantageous.

As indicated in the other aspect of this invention, however, a resin may be added to the dispersion in the previously mentioned specific proportions (up to 80 wt. % of the total of the resins).

Polymerization of the vinyl monomer or monomers in the resin solution (prepared by dissolving a resin in a hydrocarbon solvent-containing solvent boiling at not lower than 170° C.) may be carried out by a usual solution type radical polymerization method. In such a method there may be used an organic peroxide such as ditertiarybutyl peroxide, tertiarybutylcumyl peroxide, tertiarybutylperoxybenzoate, benzoyl peroxide or tertiarybutyl hydroperoxide and there may also be used an azobis-type radical polymerization initiator such as 1,1′-azobis-cyclohexane-1-carbonitrile, 2,2′-azobisisobutyronitrile or 2,2′-azobis-2,4-dimethylvaleronitrile. In such a radical polymerization, there may further be used a dispersion stabilizer such as a sorbitan fatty acid ester or 1,2-hydroxystearic acid condensate, and a molecular weight regulator such as tertiarydodecylmercaptane or 2-ethylhexyl thioglycolate.

The temperatures at which the radical polymerization of the vinyl monomer is effected are not limited. The practice of the radical polymerization at not lower than 120° C., preferably 150°–180° C., will result in the production of inks having good fluidity as well as satisfactory dryability and gloss when having printed on a substrate, since part of the vinyl monomer would be graft polymerized with the resin whereby the system is stabilized. Even in this regard, it is advantageous in this invention to use a solvent boiling at high temperatures (at least 170° C.).

The procedure of the polymerization is as follows. The hydrocarbon solvent and resin are introduced into a reaction vessel, kept at room temperature or heated to not higher than the polymerization temperature and then agitated until the resin has been uniformly dissolved in the solvent thereby to obtain a solution. At this point the resin need not be wholly used but may be so partially used that the resulting dispersion is made stable. For example, in a case where a resin containing many phenolic hydroxyl groups is used, polymerization of the vinyl monomers tends to be hindered. If in such a case the vinyl monomer is polymerized in the resin solution wherein the resin is an alkyd or petroleum resin containing no such functional groups, after which another resin is added to the solution, there will be obtained a dispersion-type vehicle usable in the preparation of inks having a satisfactory ink performance.

The features of the printing inks of this invention reside in that prints prepared from the inks may be heat set at very low temperatures and the prints so heat set have satisfactory gloss. The reason for this is not clearly known but considered to be that the polymer dispersed in the resin solution has a very fine particle size. Further, the reason why the inks of this invention have suitable fluidity in spite of being in the dispersion form, is considered to be that the resin component which does not participate in the grafting reaction with the vinyl component and in the formation of dispersed particles by physical adsorption, is dissolved uniformly in the solvent thereby to improve the fluidity and pigment dispersibility of the resulting varnish, and, in turn, inks containing the varnish will have suitable viscoelasticity. In addition, since the polymer which forms dispersed particles in the resin solution to obtain a varnish has a comparatively high molecular weight, inks containing such a varnish are advantageous in that they will form tough ink films when printed and dried on a substrate.

This invention will be better understood by the following Examples wherein all the parts are by weight.

EXAMPLE 1

A one-liter four-necked flask provided with a stirrer, thermometer, tap funnel and inlet pipe for nitrogen gas, was charged with 80 parts of a rosin-modified phenol resin (produced under the trademark of Hitanol 240 by Hitachi Kasei Co., Ltd.), 20 parts of linseed-modified alkyd resin (produced under the trademark of Aroplaz 1271 by Nisshoku Aro Co., Ltd.) and 130 parts of $C_{12-14}$ paraffinic hydrocarbons (produced under the trademark of Magie Deo 470 by Magie Brothers Oil Co.) to form a mixture which was heated to 160° C. under a nitrogen stream to obtain a solution. While keeping the thus obtained solution at 160° C., it was slowly incorporated dropwise with a mixture of 35 parts of styrene, 12 parts of ethyl methacrylate, 3 parts of acrylic acid and 2.5 parts of tertiarybutylcumyl peroxide by the use of a tap funnel over a time length of 90 minutes. After the end of the incorporation, the whole was agitated for 180 minutes and cooled to obtain a varnish having a viscosity of about 600 poise (at 25° C.) for inks.

EXAMPLES 2-6 AND COMPARATIVE EXAMPLE 1

Following the procedure of Example 1, but varying the starting materials as indicated in the following Table 1, to obtain three kinds of varnishes.

with a mixture of 35 parts of styrene, 12 parts of ethyl methacrylate, 3 parts of acrylic acid and 2.5 parts of tertiarybutylcumyl peroxide by the use of a tap funnel over a time period of 90 minutes. In this case, the time required for agitation after the incorporation of said mixture was short as compared with that required in the case of Example 1; in other words, the vinyl monomers disappeared in 60 minutes. The whole was incorporated with 54 parts of Hitanol 240 and 13 parts of Aroplaz 1271 to form a mixture which was agitated until it had been dissolved, thereby to obtain a varnish having a viscosity of about 600 poise (at 25° C.) for inks.

The varnish so obtained and the pigment as shown in Table 2 were kneaded on a 3-roll mill and adjusted in ink viscosity with Magie Deo 470 to obtain a heat-set type offset printing ink (for use on a rotary press). The

TABLE 1

| | Kind and Amount of Resin | | Kind and Amount of Solvent | | Kind and Amount of Vinyl Monomer | | Amount of Radical(*1) |
|---|---|---|---|---|---|---|---|
| | Kind | Amount (Parts) | Kind | Amount (Parts) | Kind | Amount (Parts) | Polymerization Initiator (Parts) |
| Ex. 2 | Arkon P-125(*2) | 100 | Magie Deo 470 | 140 | Styrene | 90 | 10 |
| | | | n-decanol | 20 | Isobutyl acrylate | 60 | |
| Ex. 3 | Piccopale 110(*3) | 70 | Magie Deo 470 | 100 | Styrene | 50 | 7 |
| | Aroplaz 1271 | 30 | n-decanol | 10 | Methyl methacrylate | 40 | |
| | | | | | 2-hydroxyethyl methacrylate | 10 | |
| Ex. 4 | Piccopale 110 | 100 | Magie Deo 470 | 80 | Vinyltoluene | 40 | 4 |
| | | | Dodecylbenzene | 30 | Ethyl acrylate | 10 | |
| | | | | | t.-butyl methacrylate | 45 | |
| | | | | | Methacrylic acid | 5 | |
| Ex. 5 | Hitanol 240 | 100 | Magie Deo 470 | 80 | Styrene | 10 | 1 |
| | | | Dodecylbenzene | 30 | Isobutyl acrylate | 5 | |
| | | | | | Itaconic acid | 3 | |
| Ex. 6 | Piccopale 110 | 70 | Magie Deo 470 | 80 | Styrene | 180 | 15 |
| | Aroplaz 1271 | 30 | Dodecylbenzene | 40 | Methyl acrylate | 120 | |
| Com. Ex. 1 | Hitanol 240 | 90 | Magie Deo 470 | 50 | — | — | — |
| | Aroplaz 1271 | 10 | n-decanol | 5 | | | |

Ex.: Example
Com. Ex.: Comparative Example
(*1)Radical polymerization initiator used in each of Examples 2-6 and Comparative Example 1 was t.-butylcumyl peroxide.
(*2)Trademark for alicyclic petroleum resin produced by Arakawa Chemical Industry Co., Ltd.
(*3)Trademark for thermoplastic petroleum resin produced by Esso Standard Oil Corp.

EXAMPLE 7 dryability and gloss of prints prepared from various inks are also shown in Table 2.

TABLE 2

| Kind and Amount of Varnish used | | Amount of Solvent (Magie Deo 470) | Kind and Amount of Pigment used | | Paper Temperature*1 required for drying paper (°C.) | Gloss of*2 Print (%) |
|---|---|---|---|---|---|---|
| Kind | Amount (Parts) | | Kind | Amount (Parts) | | |
| Varnish obtained in Example 1 | 78 | 12 | Lionol yellow GRH*3 (Trademark) | 10 | 80-85 | 58.5 |
| Varnish obtained in Example 2 | 75 | 10 | Lionol blue SM*4 (Trademark) | 15 | 75-85 | 48.4 |
| Varnish obtained in Example 3 | 74 | 11 | Carmine 6BH*5 (Trademark) | 15 | 83-88 | 51.0 |
| Varnish obtained in Example 4 | 75 | 10 | Lionol blue SM | 15 | 80-85 | 50.6 |
| Varnish obtained in Example 5 | 75 | 10 | Lionol blue SM | 15 | 110-120 | 51.1 |
| Varnish obtained in Example 6 | 76 | 9 | " | 15 | 90-95 | 25.3 |
| Varnish obtained in Example 7 | 76 | 14 | Lionol yellow GRH | 10 | 78-83 | 55.4 |
| Varnish obtained in Comparative Example 1 | 74 | 11 | " | 15 | 120-130 | 54.6*6 |

*1Paper temperature was measured by the use of an infrared reflection type thermometer.
*2Glass of print was measured by the use of a gloss meter manufactured by Murakami Color Technique Research Laboratory and was expressed by 60° reflection.
*3Yellow pigment produced by Toyo Ink Manufacturing Co., Ltd.
*4Blue pigment produced by Toyo Ink Manufacturing Co., Ltd.
*5Red pigment produced by Toyo Ink Manufacturing Co., Ltd.
*6The ink obtained in Comparative Example 1 was inferior in fluidity, transferability to paper, and color development.

The same four-necked flask as used in Example 1 was charged with 33 parts of Arkon P-125 and 130 parts of Magie Deo 470 to form a mixture which was heated to 110° C. under a nitrogen gas stream to obtain a uniform solution. The thus obtained solution was raised in temperature to 160° C. and slowly incorporated dropwise

What is claimed is:
1. A heat-set type printing ink comprising as the vehicle a non-aqueous dispersion prepared by dissolving at least one member selected from the group consisting of petroleum resins, modified rosin resins and alkyd resins in a hydrocarbon solvent-containing solvent boiling at not lower than 170° C. to form a resin solution and polymerizing at least one kind of vinyl monomer in said resin solution to obtain the non-aqueous dispersion.

2. A heat-set type printing ink according to claim 1, wherein the hydrocarbon solvent is a paraffinic hydrocarbon solvent and the paraffinic hydrocarbon solvent is contained in an amount by weight of at least 50% of the hydrocarbon solvent-containing solvent.

3. A heat-set type printing ink according to claim 1, wherein said at least one kind of vinyl monomer is a vinyl monomer mixture containing at least one styrene type monomer selected from the group consisting of styrene, vinyltoluene and α-methylstyrene in an amount by weight of 30-95% of the mixture.

4. A heat-set type printing ink according to claim 1, wherein said at least one kind of vinyl monomer is used in an amount by weight of 20-200 parts per 100 parts by weight of the resin.

5. A heat-set type printing ink comprising as the vehicle a final non-aqueous dispersion prepared by dissolving 20 to less than 100 parts by weight of a resin in 100-200 parts by weight of a hydrocarbon solvent-containing solvent to form a solution, polymerizing 20-200 parts by weight of at least one kind of vinyl monomer in the thus formed solution to obtain a non-aqueous dispersion and then adding up to 80 parts by weight of a resin, the resins used totalling 100 parts by weight, thereby to obtain the final non-aqueous dispersion.

* * * * *